March 13, 1934.  G. HANTJOPOULOS  1,951,192
AUTOMATIC SOIL DRILL
Filed April 26, 1933   2 Sheets-Sheet 1
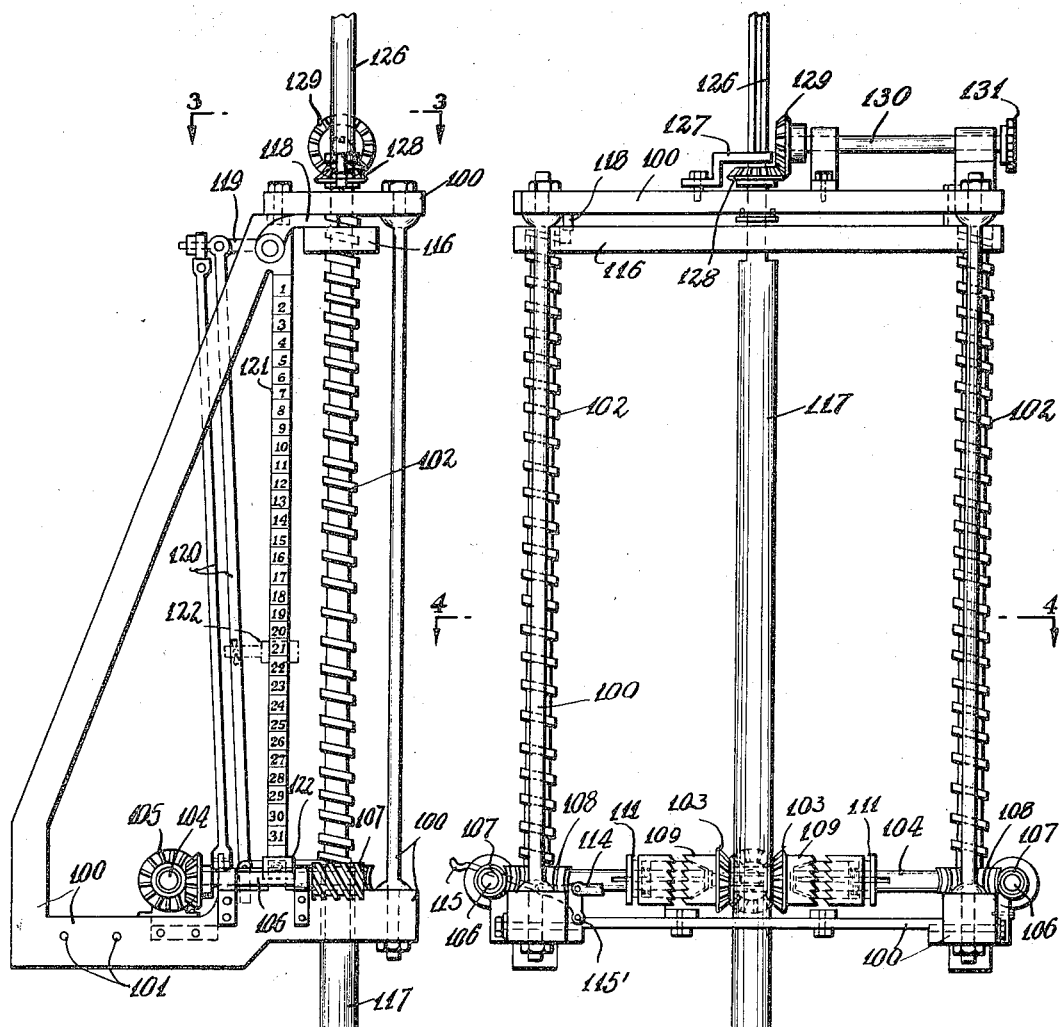
Fig. 1.
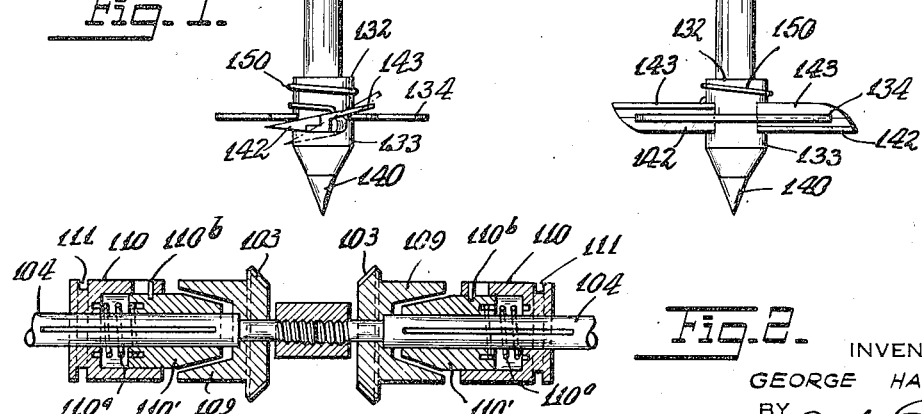
Fig. 2.
Fig. 5.
INVENTOR
GEORGE HANTJOPOULOS
BY
ATTORNEY

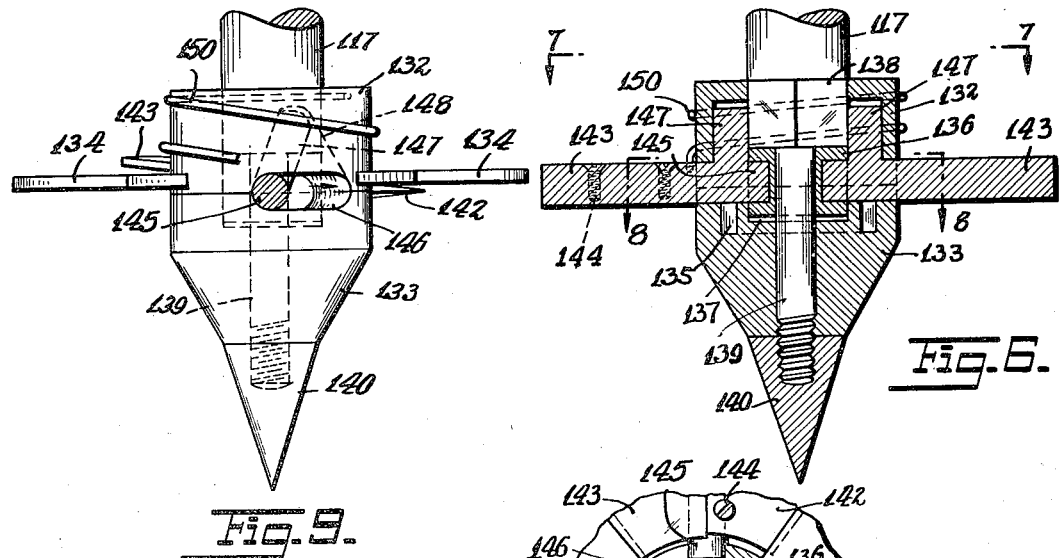
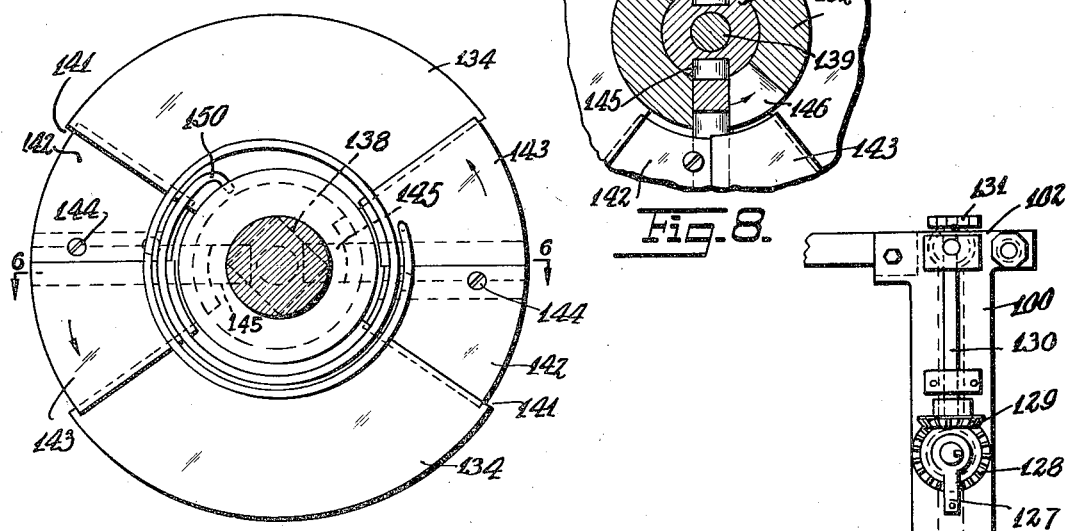
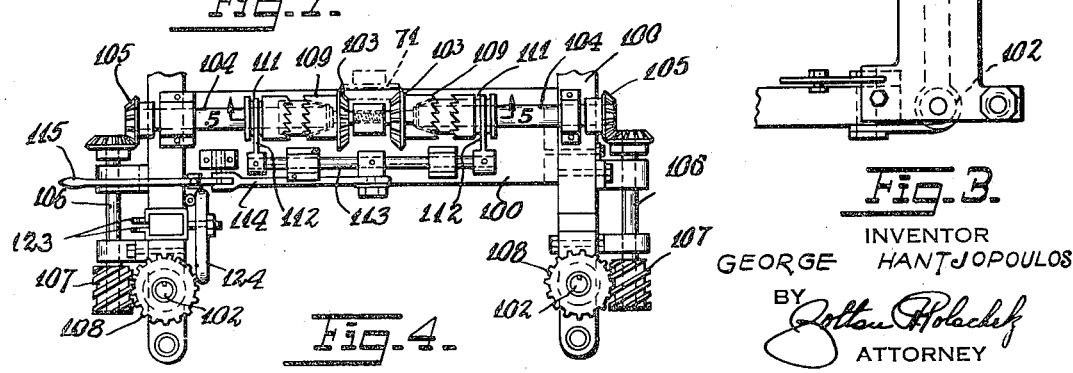

Patented Mar. 13, 1934

1,951,192

UNITED STATES PATENT OFFICE 1,951,192

AUTOMATIC SOIL DRILL

George Hantjopoulos, New York, N. Y.

Application April 26, 1933, Serial No. 667,955

7 Claims. (Cl. 255—70)

This invention is a continuation in part of my United States patent application for an automatic cultivator and planter filed July 9, 1932, Serial No. 621,682, and relates particularly to an automatic soil drill.

The invention has for an object the construction of a device as mentioned which is characterized by the provision of an attachment whereby the device may be associated with a cultivating machine to aid soil drilling and planting.

Still further the invention contemplates a novel arrangement wherein the transmission from the body of the cultivator may be used for operating the planter and the soil drill.

As a still further object of this invention it is proposed to provide an attachment capable of planting which is characterized by a drill and mechanism for controlling the depth to which the drill enters the ground, arranged so as to provide for forming of a plurality of holes throughout the area of the ground which is to receive the seeds or plants.

Still further this invention proposes a construction of a drill head in a manner so that when the drill is turned and is fed with sufficient pressure against the soil, drill shutter will automatically open and assume cutting position.

Still further this invention proposes the construction of a drill head in a manner so that the drilled earth is automatically removed upon withdrawing the drill from the ground.

Still further the invention contemplates the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an attachment for drilling and planting adapted to be used in conjunction with a cultivator as described in my previous patent application.

Fig. 2 is a side elevational view of Fig. 1.

Fig. 3 is a fragmentary plan view of Fig. 1 looking in the direction of the line 3—3.

Fig. 4 is a horizontal sectional view taken on the line 4—4 of Fig. 2.

Fig. 5 is a fragmentary enlarged sectional view taken on the line 5—5 of Fig. 4.

Fig. 6 is a fragmentary vertical sectional view of the drill head.

Fig. 7 is a horizontal sectional view taken on the line 7—7 of Fig. 6.

Fig. 8 is a horizontal sectional view taken on the line 8—8 of Fig. 6.

Fig. 9 is a side elevational view of the drill head, but illustrated with one shutter broken off.

In Figs. 1 to 5 inclusive a planter attachment has been illustrated for substitution for the cultivator attachment shown mounted upon the front of the body in Figs. 1 and 3 of the patent application previously mentioned. This planter attachment comprises a frame 100 adapted to be secured upon the sides of the body of a cultivator by the provision of apertures 101 on the respective parts adapted to receive necessary attachment bolts. A pair of spaced vertical screws 102 are rotatively mounted in the frame 100. A means is provided for causing these screws to rotate and comprises a pair of bevel gears 103 rotative upon a transverse shaft 104 rotatively mounted on the frame 100. The bevel gears 103 are adapted to engage with the driver bevel gear indicated by dot and dash lines 71.

Bevel gears 105 are mounted upon the shaft 104 and are in mesh with bevel gears upon shafts 106 rotatively mounted on the frame 100. Worms 107 are mounted upon the shafts 106 and mesh with worms 108 fixed upon the screws 102. A clutch coupling mechanism is arranged upon the shaft 104 and is adapted to connect the shaft with either one of the bevel gears 103 for controlling the rotation of the screws 102. This clutch coupling is shown in detail in Fig. 5. More particularly each of the bevel gears 103 is provided with gripping hub portions 109 adapted to be engaged by slidable jaw portions 110. Each of the jaw portions is provided with a groove 111 engaged by a fork 112.

When fork 112 is operated spring 110$^a$ is pressed which in turn moves friction clutch 110' within hub 109 until shaft 104 rotates and upon further motion of fork 112, the gripping teeth, see Figs. 2 and 4 of hub 109 and of slidable jaw portion 110 are in locking position. Pins 110$^b$ project from the clutches 110' and engage in longitudinal slots in the jaw portions 110. These forks are fixed upon a rod 113 slidably mounted on the frame 100. A link 114 is connected with the rod 113 and with a control handle 115 pivoted at 115' upon the frame 100 and is adapted to be moved in one direction or the other to control the engagement or disengagement of the clutch and frictionally maintain its position.

A mechanism is provided for automatically operating the clutch according to the particular type of operation of the device desired. More particularly a carriage 116 is engaged upon the screws 102 so as to move upwards or downwards depending upon the rotation of the screws. This carriage carries a drill 117. Mounted upon the top of the frame 100 there is a finger 118 extended into the path of motion of the carriage 116. This finger is pivotally mounted and has a rear projection 119 which is connected with links 120, one of which connects with the handle 115.

The frame 100 has a portion 121 which is parallel to one of the screws 102. This portion is graduated to represent depths of the drill. A slide 122 is arranged slidably upon the portion 121 and is adapted to assume various positions and maintain these positions by reason of being clamped in place by the drawing together of the ends 123, see Fig. 4, by a suitable bolt. An arm 124 is pivotally mounted upon the slide 122 and has one end extending into the path of motion of the carriage 116 and has its other end clampable at various positions upon one of the links 120. The arrangement is such that the slide 122 may be moved to any position upon the scale and be secured in place in a manner so that when the carriage 116 moves downwards and strikes the free end of the pivot member 124 motion will be transmitted to one of the links 120 to cause operation of the handle 115 and thus cause automatic shifting of the clutch to the neutral position. It should be noticed that the clutch will be shifted to the neutral position when the carriage 116 reaches its top position and likewise when the carriage reaches the bottom position determined by the position of the slide 122.

The drill 117 is rotatively supported in the carriage 116 and has a keyed top end 126, slidably extending through the top of the frame 100. A bracket 127 mounted upon the frame 100 serves to hold the gear 128 in mesh with gear 129. The bevel gear 128 is slidably keyed upon the reduced portion 126 and meshes with a bevel gear 129 on a stud shaft 130 rotative on the frame 100. This stud shaft is provided with a gear 131 adapted to connect with some source of rotation not shown on the drawings to cause rotation of the drill.

In Figs. 6-9 inclusive, details of the drill head have been disclosed. It is shown to comprise a head member consisting of an upper section 132 and a lower section 133. A circular flange 134 is firmly fixed on the upper section 132. The upper end of the lower section 133 is formed with an annular opening 135 which is for the purpose of holding a lubricant. A disc 136 is rotative within a central opening formed in the hub portion 134 and rests within a circular recess 137 in the top of the lower section 133.

The drill shaft 117 extends through the upper section 132 and is formed with a square portion 138 adapted to connect the head member thereon for turning in unison. This square portion 138 partially extends into a central opening in the upper section 132, indicated by the dot line in Fig. 7 and rests against the upper face of the disc 137. A reduced end 139 projects from the bottom of the shaft 117 and extends through the center of the disc 137 so that the disc is rotative and furthermore extends through the lower section 133. A drilling point 140 is threadedly engaged upon the reduced end 139 and acts as a nut for tightly clamping the disc 137 and the lower section 133 together.

The circular flange 134 is formed with a pair of diametrically opposite openings 141 in which a pair of shutters are movably arranged. These shutters comprise a front cutting member 142 and a rear tail member 143 held together by screws 144. The front cutting member 142 is disposed below one side of the opening 141 while the tail member 143 is located above the other side of said opening. The arrangement is such that normally the shutter closes the opening as clearly illustrated in Fig. 1 but may move to the dot and dash line position in Fig. 1 as hereinafter fully explained to partially open the opening 141 to allow the passage of the material being drilled.

A stem 145 projects from each of the shutters and passes through elongated horizontal slots 146 formed in the head member. Portions of these slots are formed upon the lower section 133 of the head member and the other portions are formed upon the upper section 132, clearly illustrated in Fig. 9. The stems 145 rotatively engage into opposite sides of the disc 137, so as to be capable of pivoting and furthermore so as to transmit motion from one of the shutters to the other of the shutters. A finger 147 projects from each of the stems 145 and are disposed within triangular recesses 148 formed in the upper portion 132. In Fig. 6 the fingers 148 are clearly illustrated. A spring 150 engages about the head member and has one of its ends connected with the head member and the other of its ends connected with one of the shutters so as to normally urge the shutters into the closed position, that is the position shown in full lines in Fig. 1.

In operation, when the drill head is forced downwards into the ground under the rotations and advancement of the shaft 117, the frictional engagement of the shutters against the soil will cause them to automatically move into their open positions, that is, the positions indicated by the dot and dash lines in Fig. 1. In the open positions the soil will be capable of passing upwards through the openings 141 above the circular flange 134. The drill may be engaged any depth into the ground. When the drill is reversed to be retracted from the ground the frictional resistance of the shutters upon the soil and the action of the spring 150 will cause the shutters to close and so hold all of the earth above the circular flange 134. Consequently when the drill is withdrawn all the earth above the drill will also be forced out from the drilled opening.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A soil drill point for a drill of a device of the class described, comprising a head member consisting of an upper section and a lower section, a disc rotative in a recess within these sections, a shaft with a square portion extended into the upper section and having a reduced end engaging through said disc and through the lower section in a manner so that the shoulder forming the reduced end engages against the top face of said disc, a drilling point threadedly engaged upon the reduced end of said shaft, a circular flange firmly mounted on said upper section and formed with diametrically opposite openings, movable shutters within said openings and having front cutting edges disposed beneath one of the edges of the openings and inclined upwards so that the other edges engaged above the other edges of said openings, a stem projecting from each shutter through elongated horizontal slots formed in said head member and rotatively engaging into the edge of said disc and having projecting fingers engaging into triangular openings within the upper section of said head member so as to cause the shutters to tilt when the stems move from one of the ends of the horizontal slots to the other ends, and a spring mounted upon said head member and engaging one of said shutters to urge said shutters into the closed position.

2. A soil drill point for a drill of a device of the class described, comprising a head member consisting of an upper section and a lower section, a disc rotative in a recess within these sections, a shaft with a square portion extended into the upper section and having a reduced end engaging through said disc and through the lower section in a manner so that the shoulder forming the reduced end engages against the top face of said disc, a drilling point threadedly engaged upon the reduced end of said shaft, a circular flange firmly mounted on said upper section and formed with diametrically opposite openings, movable shutters within said openings and having front cutting edges disposed beneath one of the edges of the openings and inclined upwards so that the other edges engaged above the other edges of said openings, a stem projecting from each shutter through elongated horizontal slots formed in said head member and rotatively engaging into the edge of said disc and having projecting fingers engaging into triangular openings within the upper section of said head member so as to cause the shutters to tilt when the stems move from one of the ends of the horizontal slots to the other ends, and a spring mounted upon said head member and engaging one of said shutters to urge said shutters into the closed position, said drilling point acting as a nut for holding the disc and said lower section.

3. A soil drill point for a drill of a device of the class described, comprising a head member consisting of an upper section and a lower section, a disc rotative in a recess within these sections, a shaft with a square portion extended into the upper section and having a reduced end engaging through said disc and through the lower section in a manner so that the shoulder forming the reduced end engages against the top face of said disc, a drilling point threadedly engaged upon the reduced end of said shaft, a circular flange firmly mounted on said upper section and formed with diametrically opposite openings, movable shutters within said openings and having front cutting edges disposed beneath one of the edges of the openings and inclined upwards so that the other edges engaged above the other edges of said openings, a stem projecting from each shutter through elongated horizontal slots formed in said head member and rotatively engaging into the edge of said disc and having projecting fingers engaging into triangular openings within the upper section of said head member so as to cause the shutters to tilt when the stems move from one of the ends of the horizontal slots to the other ends, and a spring mounted upon said head member and engaging one of said shutters to urge said shutters into the closed position, each of said movable shutters comprising a front edge member and a rear tail member attached together.

4. A soil drill point for a drill of a device of the class described, comprising a head member consisting of an upper section and a lower section, a disc rotative in a recess within these sections, a shaft with a square portion extended into the upper section and having a reduced end engaging through said disc and through the lower section in a manner so that the shoulder forming the reduced end engages against the top face of said disc, a drilling point threadedly engaged upon the reduced end of said shaft, a circular flange firmly mounted on said upper section and formed with diametrically opposite openings, movable shutters within said openings and having front cutting edges disposed beneath one of the edges of the openings and inclined upwards so that the other edges engaged above the other edges of said openings, a stem projecting from each shutter through elongated horizontal slots formed in said head member and rotatively engaging into the edge of said disc and having projecting fingers engaging into triangular openings within the upper section of said head member so as to cause the shutters to tilt when the stems move from one of the ends of the horizontal slots to the other ends, and a spring mounted upon said head member and engaging one of said shutters to urge said shutters into the closed position, one of the ends of said spring being secured upon said head member and the other end upon one of said shutters.

5. A drill point for a drill of the device of the class described, comprising a head element provided with a bottom point, a flange member projecting from said element and having openings on diametrically opposite sides, cutting members normally closing said openings, and resilient means for urging said cutting members into the positions in which they close the openings, said parts being arranged so that when the drill is driven downwards the cutting members open and allow the passage of drilled material, said cutting members being rotatively held on said flange member and assume an angular position when the said passage is open.

6. In a soil drill point, a flange member having openings extended in from the periphery, cutting members normally closing said openings, resilient means holding each cutting member in a position with one edge extending beneath one edge of one of said openings and the opposite edge extending over the opposite edge of said opening, and means for causing said cutting member to twist for moving away from the edges of said openings when the tool is forced downwards in one direction.

7. In a soil drill point, a flange member having openings extended in from the periphery, cutting members normally closing said openings, resilient means holding each cutting member in a position with one edge extending beneath one edge of one of said openings and the opposite edge extending over the opposite edge of said opening, and means for causing said cutting member to twist for moving away from the edges of said openings when the tool is forced downwards in one direction, comprising a stem for each cutting element engaging in a horizontal slot in said drill point and having a finger engaging in a triangular opening in said drill point.

GEORGE HANTJOPOULOS.